United States Patent [19]

Elsner

[11] Patent Number: 5,150,409

[45] Date of Patent: Sep. 22, 1992

[54] DEVICE FOR THE IDENTIFICATION OF MESSAGES

[76] Inventor: Peter Elsner, Fritz-Baer-Str. 27, 8000 Munich 71, Fed. Rep. of Germany

[21] Appl. No.: 458,707

[22] PCT Filed: Aug. 11, 1988

[86] PCT No.: PCT/EP88/00717

§ 371 Date: Jan. 19, 1990

§ 102(e) Date: Jan. 19, 1990

[87] PCT Pub. No.: WO89/01690

PCT Pub. Date: Feb. 23, 1989

[30] Foreign Application Priority Data

Aug. 13, 1987 [DE] Fed. Rep. of Germany ....... 3726901
Aug. 10, 1988 [DE] Fed. Rep. of Germany ....... 3827172

[51] Int. Cl.$^5$ .............................................. H04K 1/00
[52] U.S. Cl. .................................................... 380/23
[58] Field of Search ....................... 380/23, 25, 28, 33, 380/37, 42, 49; 364/200, 900

[56] References Cited

U.S. PATENT DOCUMENTS 3,971,916  7/1976  Moreno .
4,797,672  1/1989  Kousa ................... 380/25

FOREIGN PATENT DOCUMENTS 0020999  1/1981  European Pat. Off. .
0022069  1/1981  European Pat. Off. .
0027853  5/1981  European Pat. Off. .
2224937  2/1974  Fed. Rep. of Germany .
2451711  5/1976  Fed. Rep. of Germany .
2657182  6/1978  Fed. Rep. of Germany .
3009317  9/1981  Fed. Rep. of Germany .
3129911  3/1983  Fed. Rep. of Germany .
3311665  10/1984  Fed. Rep. of Germany .
3340582  5/1985  Fed. Rep. of Germany .
3628525  2/1987  Fed. Rep. of Germany .
3534026  3/1987  Fed. Rep. of Germany .
37323432  4/1988  Fed. Rep. of Germany .
3712089  10/1988  Fed. Rep. of Germany .
546446  2/1974  Switzerland .

OTHER PUBLICATIONS

Article: "Practical Aspects of Doubly Chained Trees for Retrieval", vol. 19, by L. E. Stanfel; Journal of the Assoc. for Computing Machinery; No. 3, Jul. 1972; pp. 425-436.
"Datenbanksysteme Aufbau und Einsatz; by J. Niedereichholz; ISBN 3 7908 0249 2".
Datenstrukturen und ihre Anwendung; by Lewis/Smith.
Patent Abstracts of Japan, vol. 2, No. 10, p. 10293 E 77; Jan. 25, 1978 52-125239 (Tatsuaki Yamagishi).
"Der selbstlernende und programmierfreie Assoziationscomputer" (The self-learning and program-free association computer) by Klaus Holtz et al.; Elektronik 1978, vol. 14, pp. 39-65.

Primary Examiner—Thomas N. Tarcza
Assistant Examiner—David Cain
Attorney, Agent, or Firm—W. G. Fasse; D. H. Kane, Jr.

[57] ABSTRACT

An apparatus and a method for the identification and encrypting/decrypting of messages permits converting an input message provided as characters, in character-by-character fashion and depending on preceding characters, to form an output message. An address branching network is employed for encrypting/decrypting. The address branching network includes selectable branches that are carriers of encrypting/decrypting characteristics. The selection of such branches is done in a step-by-step selection run through the branching network to convert any specific input message of optional length character-by-character into a specific selection path through the branching network. The output message is formed on the basis of the encrypting/decrypting characteristics from the branches selected on said selection path.

25 Claims, 7 Drawing Sheets

| MEMORY UNIT 1 | | STORAGE UNIT A | | | |
|---|---|---|---|---|---|
| A | A / DO | A | INPUT | OUTPUT | III |
| | DI = 0 | DI = 1 | | | | |

| | A | DI=0 | DI=1 | A | INPUT | OUTPUT | III |
|---|---|---|---|---|---|---|---|
| 1 | 0 | 1/01 | | | | | |
| | 1 | | 2/01 | | | | |
| | 2 | 3/01 | | | | | |
| | 3 | 0/11 | | 0 | 0100 | A | 0 |
| 2 | 0 | 1/01 | | | | | |
| | 1 | 4/01 | 2/01 | | | | |
| | 2 | 3/01 | | | | | |
| | 3 | 0/11 | | | | | |
| | 4 | | 5/01 | | | | |
| | 5 | 1/11 | | 1 | 0010 | B | 1 |
| 3 | 0 | 1/01 | | | | | |
| | 1 | 4/01 | 2/01 | | | | |
| | 2 | 3/01 | | | | | |
| | 3 | 0/11 | | | | | |
| | 4 | | 5/01 | | | | |
| | 5 | 1/11 | 2/11 | 2 | 0011 | C | 0 |
| 4 | 0 | 1/01 | 6/01 | | | | |
| | 1 | 4/01 | 2/01 | | | | |
| | 2 | 3/01 | | | | | |
| | 3 | 0/11 | | | | | |
| | 4 | | 5/01 | | | | |
| | 5 | 1/11 | 2/11 | | | | |
| | 6 | | 7/01 | | | | |
| | 7 | 8/01 | | | | | |
| | 8 | 3/11 | | 3 | 1100 | D | 0 |
| 5 | 0 | 1/01 | 6/01 | | | | |
| | 1 | 4/01 | 2/01 | | | | |
| | 2 | 3/01 | | | | | |
| | 3 | 0/11 | | | | | |
| | 4 | | 5/01 | | | | |
| | 5 | 1/11 | 2/11 | | | | |
| | 6 | | 7/01 | | | | |
| | 7 | 8/01 | 9/01 | | | | |
| | 8 | 3/11 | | | | | |
| | 9 | | 4/11 | 4 | 1111 | E | 0 |

FIG. 2

| A | ENCODING DO | A/DO FOR DI= | | | | DECODING A/DO FOR D1= | | | |
|---|---|---|---|---|---|---|---|---|---|
| | | 1 | 2 | 3 | 4 | 5 | 6 | 7 | 8 | 9 |
| | | 00 | 01 | 10 | 11 | A | B | C | D |
| 0 | A | 3/A | 6/C | 5/D | 2/B | 3/00 | 2/11 | 6/01 | 5/10 |
| 1 | C | 0/A | 5/D | 1/C | 7/B | 0/00 | 7/11 | 1/10 | 5/01 |
| 2 | B | 4/D | 7/B | 1/C | 3/A | 3/11 | 7/01 | 1/10 | 4/00 |
| 3 | A | 4/D | 3/A | 2/B | 1/C | 3/01 | 2/10 | 1/11 | 4/00 |
| 4 | D | 7/B | 6/C | 5/D | 0/A | 0/11 | 7/00 | 6/01 | 5/10 |
| 5 | D | 1/C | 4/D | 2/B | 0/A | 0/11 | 2/10 | 1/00 | 4/01 |
| 6 | C | 5/D | 0/A | 1/C | 2/B | 0/01 | 2/11 | 1/10 | 5/00 |
| 7 | B | 2/B | 6/C | 3/A | 4/D | 3/10 | 2/00 | 6/01 | 4/11 |

| CHARACTER NO. | ENCODING | | | DECODING | | |
|---|---|---|---|---|---|---|
| | D1 | A | D0 | D1 | D0 | A |
| 1 | 01 | 6 | C | C | 01 | 6 |
| 2 | 10 | 1 | C | C | 10 | 1 |
| 3 | 11 | 7 | B | B | 11 | 7 |
| 4 | 01 | 6 | C | C | 01 | 6 |
| 5 | 00 | 5 | D | D | 00 | 5 |
| 6 | 10 | 2 | B | B | 10 | 2 |

| MEMORY ADDRESS A | DO | ENCODING A/DO | | DECODING A/DO | |
|---|---|---|---|---|---|
| | 1 | 2 | 3 | 4 | 5 |
| | | DI=0 | DI=1 | DI=0 | DI=1 |
| 0 | 0 | 1/1 | 3/0 | 3/1 | 1/0 |
| 1 | 1 | 0/0 | 2/1 | 0/0 | 2/1 |
| 2 | 1 | 1/1 | 3/0 | 3/1 | 1/0 |
| 3 | 0 | 1/1 | 3/0 | 3/1 | 1/0 |

| MEMORY ADDRESS | | DO | ENCODING A/DO | | | | | | DECODING A/DO | | | | | |
|---|---|---|---|---|---|---|---|---|---|---|---|---|---|---|
| A0 | A1 | 1 | 2 | | | 3 | | | 4 | | | 5 | | |
| | | | DI=0 | | | DI=1 | | | DI=0 | | | DI=1 | | |
| | | | A0 | A1 | DO | A0 | A1 | DO | A0 | A1 | DO | A0 | A1 | DO |
| 0 | 0 | 0 | 0 | 1 | 1 | 1 | 1 | 0 | 1 | 1 | 1 | 0 | 1 | 0 |
| 0 | 1 | 1 | 0 | 0 | 0 | 1 | 0 | 1 | 0 | 0 | 0 | 1 | 0 | 1 |
| 1 | 0 | 1 | 0 | 1 | 1 | 1 | 1 | 0 | 1 | 1 | 1 | 0 | 1 | 0 |
| 1 | 1 | 0 | 0 | 1 | 1 | 1 | 1 | 0 | 1 | 1 | 1 | 0 | 1 | 0 |

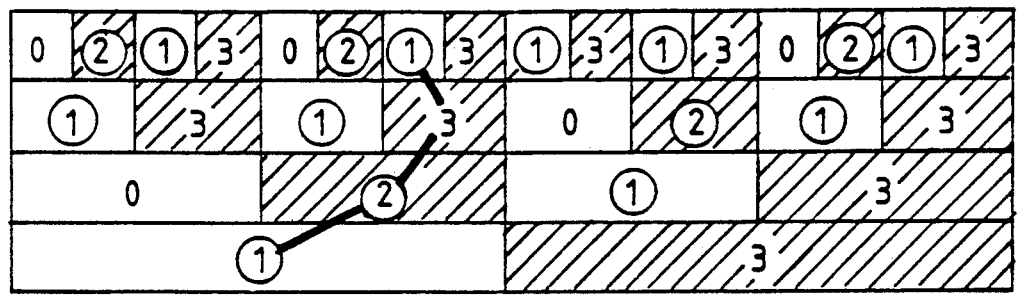
FIG.11
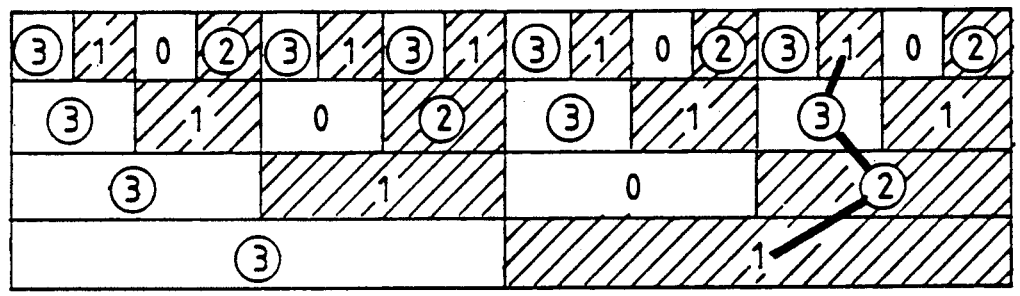
FIG.12
| A-IDENTIFIER | I-IDENTIFIER | I1-IDENTIFIER |
|---|---|---|
| 0 0 0 0 | 1 0 1 0 | 1 1 1 1 |
| 0 0 0 1 | 1 0 1 1 | 0 0 1 1 |
| 0 0 1 0 | 1 0 0 1 | 0 1 0 0 |
| 0 0 1 1 | 1 0 0 0 | 1 0 1 1 |
| 0 1 0 0 | 1 1 1 0 | 1 1 0 0 |
| 0 1 0 1 | 1 1 1 1 | 0 0 0 0 |
| 0 1 1 0 | 1 1 0 1 | 0 1 1 0 |
| 0 1 1 1 | 1 1 0 0 | 1 0 0 0 |
| 1 0 0 0 | 0 1 0 1 | 0 1 1 1 |
| 1 0 0 1 | 0 1 0 0 | 1 0 0 1 |
| 1 0 1 0 | 0 1 1 1 | 0 0 0 1 |
| 1 0 1 1 | 0 1 1 0 | 1 1 0 1 |
| 1 1 0 0 | 0 0 1 0 | 1 1 1 0 |
| 1 1 0 1 | 0 0 1 1 | 0 0 1 0 |
| 1 1 1 0 | 0 0 0 1 | 0 1 0 1 |
| 1 1 1 1 | 0 0 0 0 | 1 0 1 0 |
FIG.13

DEVICE FOR THE IDENTIFICATION OF MESSAGES

1. FIELD OF THE INVENTION

The field of this invention concerns the technical area of message encoding/decoding and more particularly the area of the identification of-messages, objects, persons, etc. In logical terms, encoding, identification and decoding as employed in the invention are closely related to one another.

In principle, identification, just as decoding, is the interpretation and/or conversion of characteristics and messages of a code into characteristics and messages of another code. The process and the apparatus for carrying out the present process can be employed for both the encoding and decoding of messages and for identification tasks.

2. BACKGROUND INFORMATION

A known method of personal identification is the fingerprint. Due to the extreme diversity of the individual features contained in a fingerprint, it stores such a large "personal data record" that it can be considered an unmistakable, forge-proof means of identification. An advantage is that it cannot be lost and that it is always available. The identification systems based on fingerprinting are often extremely complex, however.

DE-PS 3712089 describes a solution for such complexity whereby a finger positioned on a finger support is scanned by means of sensors and a light-pulse source; the sensor signals are analyzed in a computer circuit. The computer utilizes reading, comparison and storage of the identification information by an additional control computer. Although this solution is intended to provide the most compact configuration possible, identification systems based on this solution are still extremely complex and unsuitable for universal application.

A further known method of identification is that of electronically operating identification in the form of magnetic cards or chip cards used as check cards. An electronic key card, which opens several differently coded locks, is described in DE-OS 3628525: The key card contains a code at both ends and thereby enables access to be gained to at least two locks. The disadvantage of these cards is that they must be kept somewhere, and they can be lost, forgotten, stolen, etc.. Moreover, they are not immediately available and usable in every situation in life, including dangerous situations. A further disadvantage is that they require space-and cost-intensive analysis stations and that they are sensitive to mechanical deformation and damage.

Swiss patent specification 546 446 concerns a device employing data carriers to identify individuals by means of a testing station, the objective of which is to protect the identification data against duplication and unauthorized access. For this purpose, a mutual exchange of information sequences takes place between data carrier and testing station. The data carrier and testing station compare the information sequences with their respective stored information sequences, whereby the testing station generates a "good-signal" when the sequences match. This Swiss patent provides a solution for data communication between data carrier and testing station, but complex information generators with memories, comparators and switches are required on both sides. A disadvantage here is the extensive scope of electronic circuitry equipment required and the consequent high production costs and restricted range of application. Universal application for a large number of different applications, some of which may not arise until the data carrier is in use, is not possible here, as each case of application, i.e. each testing station requires its own protected memory areas in the data carrier, some of which would have to be programmed after the data carrier had been put into use. A similar solution is described in DE-PS 2224937.

U.S. Pat. No. 3,971,916 describes a means of identification in the form of a portable memory unit designed primarily for bank applications, in which a personal, secret identity number, the number of the bank account and further personal data are programmed when the unit is issued to the holder, whereby the unit can be designed as a ring to be worn on the finger. Disadvantages are the programming required for each case of application and the limited data capacity of the memory unit, which represents an obstacle to universal use.

DE OS 2657182 describes a means of identification in the form of a data carrier which transmits information stored in the data carrier to an analysis unit as a result of energy coupling with the analysis unit. The data carrier can he designed as a ring to be worn on the finger, which is supplied with energy from the analysis unit. A disadvantage of this solution is the limited amount of information in the data carrier, which cannot remain secret and which requires allocation and monitoring for several users. Accordingly, this patent's teaching is not suitable for universal application.

A common feature of these known solutions is that the identity and the codes authorized to investigate the identity must in each case be programmed into the means of identification. Such programming, in addition, must be done in a manner specifically relating to the individual application. Comparison is required in the programming and, as a result modifications and monitoring requirements make the solutions unsuitable for universal use, nor are they independent of any specific applications. Furthermore, none of the known means of identification enable the identity-related data to be protected, i.e. data coding.

Data coding systems are known whereby the communication partners possess the same key information, e.g. in the form of random information, on data carriers; and such partners use this key information to encode/decode messages directly, bit by bit, whereby the bits of the key information are used once only. A disadvantage of these systems is the very high level of requirement for key information, together with synchronization problems between the communication partners.

Coding systems are also known which solve the problem of the bothersome requirement for key information by means of key generators, which generate key information to be mixed with the plain text on the basis of various basic keys. A disadvantage of these systems is the problem of keeping these basic keys, which are to be replaced at intervals, secret.

European patent application 0 022 069 specifies a solution to this above-identified problem, (involving constant renewal of these keys at the place of encoding/decoding) by separate, isolated key containers with a key capacity of approx. one year. OS 3340582 describes a similar, improved key storage module, consisting of a key generator and a loadable and erasable source-key storage unit, whereby the key generator processes the internal source keys in the module, which cannot be read externally, with a supplementary key provided externally by the key unit and passes the result on to the key unit as a basic key. A disadvantage of these two solutions is the limited effective life of the keys, which necessitates re-loading of the key storage units in the course of time.

Devices known as pseudo-random generators for coding systems include the multi-stage feedback shift registers specified in PS 2451711 and OS 3732432, whereby the key is determined by the number of stages and the configuration of the feedback system, i.e. the hardware circuitry. These systems are not suitable for universal use for varying applications because the message transmitter and receiver require the same device. Furthermore, the feedback operations of the shift registers limit the operating speed of these systems.

PS 3129911 describes a pseudo-random generator in the form of a read/write memory loaded with random information, from which this random information, addressed via a loadable address counter, is read out. This solution is unsuitable for coding operations, as the random information of this generator is simple to establish.

The common disadvantage shared by all known coding systems is that their key sources do not remain permanently stable and that they are limited to a specific application.

DE 3009317 and DE 3311665 describe a hybrid associative storage system, consisting of a non-associative base memory divided into sub-memory units, whereby these sub-memory units are connected cyclically and in succession via a connection device to an association matrix functioning as an associative search surface, in order to reduce the search times.

DE 3539026 provides a solution for a fast-operating search process for such hybrid associative storage systems.

A common characteristic of these known associative storage systems are the time-consuming search processes required for memory access, whereby the aim of the known solutions is to increase the size of the search surface and to accelerate the search process by means of suitable circuitry and data-structuring. The search times and internal connections of these storage systems increase substantially as the storage capacity is extended, as a result of which these systems are often too small or complex for data-base applications, for example.

Additional prior art of interest include the following literature references:

(1) L. E. Stanfel "Practical aspects of doubly chained trees for retrieval" Journal of the Association for Computing Machinery; vol. 19, no. 3, July, 1972, pages 425–430.

(2) Lewis/Smith "Datenstrukturen und ihre Anwendung" 1978 R. Oldenbourg Verlag publishers, Munich (3) J. Niedereichholz "Datenbanksysteme, Aufbau und Einsatz" 1981 Physics Verlag publishing company, Vienna The document, "Practical aspects of doubly chained trees for retrieval" (1) describes doubly chained trees, the nodes of which each store two addresses and a key definition which is searched for in the tree. Searching is carried out serially, character-by-character, by comparing the search argument with the stored key definition, whereby the next nodal level is addressed for the next search argument character when the search argument and the key definition match (son-indicator address), and if they do not match the search is continued at the neighboring node on the same nodal level (brother-indicator address), until either the sought key definition is found or the required new key definition is finally stored at the end of the chain.

Similar search trees are known in the form of B-trees, binary trees, sorted binary trees, chained lists, etc. (See references 2, 3). They differ in the number of branches which emanate from a node and in the chaining principles. A common characteristic shared by all these, however, is the required search process by means of character-by-character comparison of a search argument with stored key definitions.

SUMMARY OF THE INVENTION

The invention relates to a method and apparatus suitable as a universally applicable, permanently stable, particularly space-saving and relatively inexpensive device for the purposes of identification and/or identity-related information coding that is encoding/decoding. Coding is achieved by means of individual data carriers. Such carriers, for a diverse number of different, unrelated applications serve both for identification and as a key source. The invention, requires only one individual data carrier which, once produced, is able to cover the requirements of all possible, different applications, including future applications, without modification.

At the same time, the device of the invention is forge-proof, simple to handle and constantly available for person-related applications, such as finger prints.

The invention solves the problems presented in the prior art by a method of universally applicable, secure access and identification of an individual inquiry made by an unknown input signal into an associative response memory. That inquiry has a unique identity from among many such unknown input inquiries that may be made. The present method includes the steps of: (a) storing one only identification signal within said memory, which signal is not read out from the memory, but rather is internally self-addressable to other locations in the memory in accordance with the contents of said input signal; (b) defining for each inquiry signal that is initially input into said associative memory a reference signal that is formed associatively within content-addressed locations in said memory, which locations define a particular reference signal which is independent of any other reference signal in said memory; and (c) issuing from the memory, whenever said initially entered input signal is again input into said memory, a specifically assigned individual response signal which reveals that the input signal was properly identified.

Moreover, the invention includes an address branch tree formed in an input-content addressable associative read only memory that is employed for encoding/decoding, encryption, or secure communication. Such a branch-tree includes addressed branches that are carriers of unique encoding/decoding characteristics. The selection of such discrete branch networks is done by a step-by-step selection run through the memory so as to convert an individual input message of arbitrary length into an individual branch network. An output from the memory is formed based upon the encoding/decoding characteristics from the branch network as formed by said selection run-through.

A preferred embodiment of the invention, which is particularly space-saving and small-scale due to the process which is employed, includes the steps of bit-bybit message encoding/decoding by means of a memory unit. An example of a system designed in accordance with this embodiment is described in detail hereinafter in connection with the drawing.

Inventive features further include individual identification with an identification base in the form of individual, arbitrary identification information which can be stored by means of data processing, to which any identity-related questions, i.e. inquiry messages, associate specific identity responses, i.e. response messages, which are assigned in accordance with the individual key of the identification base.

This present principle of an associated, individual encoding/decoding of an arbitrary inquiry message into a specifically assigned response message enables a practically unlimited number of possible response messages to be attained using a small amount of storage capacity. A memory unit employing binary organization with an identification base of 256 addresses, for example, provides up to $10^{75}$ possible different inquiry/response messages, enabling many users to obtain specifically assigned individual response messages to arbitrary individual inquiry messages from one and the same identification data carrier of the identification object. Such an operation is achieved, independently of one another and without any requirement for prior consultation. This means that this one individually assigned identification data carrier is suitable for universal use for any different and mutually independent applications relating to identification and/or identity-related coding.

Due to its virtually unlimited response capacity, any number of new, additional applications will not require any modification to the identification base, which means that the basis can be produced in the form of a content-addressable permanently stable read-only memory.

In accordance with the invention, these read-only memories which function as identification bases can contain any information, which is never read out, but merely serves as a basis to which inquiry messages are associated. This basis information can be completely unknown, inaccessible, non-reproducible random information which is generated once only, when the memory unit is produced. This means that unique, forge-proof memory units can be produced without recording the identification information, i.e. they offer absolute data protection, and the data is secret and cannot be reproduced. Reproduction of the identification information via the associated response messages will be totally impossible for message block lengths of, for example, 256 bits, even when the most modern data-processing systems of the future are employed.

Reproduction by "opening" the memory is prevented by automatic destruction which takes place upon opening. This means that no-one, including the owner of the identification-data carrier, is able to obtain knowledge relating to the identification base; the only information which can be established are the associated response messages for each defined inquiry message. These unique response messages are established for each case of application by an initial reading procedure which opens the case of application concerned, by means of defined inquiry messages assigned to this particular case of application. The response messages are stored associatively as a reference for future identification operations in the appropriate analysis system, as a result of which they are accesible only via the identification process. As many different analysis systems as are required can therefore obtain as many response messages from the same data carrier as appears expedient, without any knowledge of the identification base.

These data carriers can be designed at low cost and in a space-saving form as integrated circuits with a chip surface of less than 4 mm$^2$ in accordance with the state of the art in CMOS technology, for example, or a different, future large-scale integration technology.

A further sub-task of making the individual data carrier simple to handle and constantly available for person related application is solved by the claimed invention. These solutions combine the advantages of simple handling and constant availability, such as are offered, for example, by finger prints, with the advantages of electronic storage units which can be integrated into data systems by means of data technology at low cost.

These requirements and advantages over the prior art are fulfilled by the novel principle involved in the invention of content-addressable associative message encoding/decoding. As the identification base of the data carrier is absolutely secret, forge-proof and impossible to copy when produced in the appropriate configuration, the data carrier possesses unmistakable, verifiable authenticity features, which open up relevant fields of application such as forge-proof identification cards, currency, etc.

These and other objects, advantages and novel features of my apparatus and method invention are described in more detail hereinafter.

BRIEF DESCRIPTION OF THE DRAWING

FIG. 2 shows an input-content memory unit organized associatively in accordance with the coding/decoding and address branch tree principle of FIG. 1.

FIG. 11 is a table useful in demonstrating an assignment key of the data carrier for one assignment direction.

FIG. 12 is a table useful in demonstrating an assignment key of the data carrier for another assignment direction.

FIG. 13 is an assignment table for inquiry and response messages formulated in accordance with the invention.

DESCRIPTION OF THE PREFERRED EMBODIMENT(S) OF THE DRAWING AND THE INVENTION

Figures 4, 5, 6:
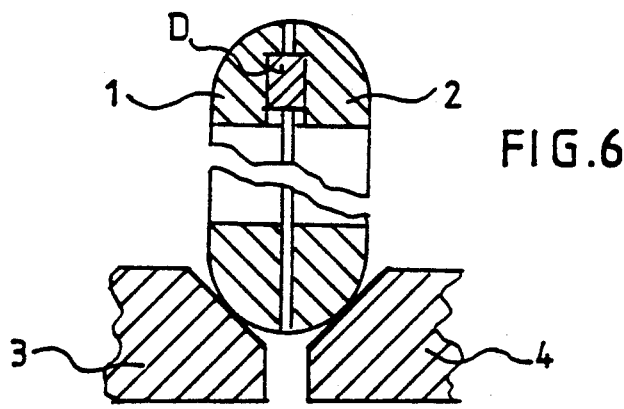
FIG. 4 shows the principle of an identifier and coding device in a table containing the identification information stored in address 0 to 7 of a memory unit, wherein binary input data, DI, is converted into a letter sequence as output data, DO, and vice-versa.
FIG. 5 is an additional table showing a letter-to-binary and binary-to-letter example which is useful in promoting a clearer understanding of FIG. 4.
FIG. 6 depicts an individual data carrier as designed in the form of a ring to be worn on the finger.

FIG. 4 shows the principle of the identifier and coding device formulated in accordance with the invention as a table. The table of FIG. 4 may be understood by means of its headings rows and columns. Such a table contains identification information stored in address 0 to 7 of a memory unit. In this example binary input data, DI, is converted into a letter sequence as output data, DO, and vice-versa.

For the purpose of encoding, column 1 of all locations stores arbitrary output data, A, B, C or D. For the purpose of encoding, columns 2 to 5 store per location four arbitrary next addresses, A, of locations with different output data; in each case, the next binary character, 00 to 11, of the input data, DI, selects one of these addresses, which is read, assigned to this character.

In accordance with this assignment stipulated by the coding operation, for the purpose of decoding, columns 6 to 9 for each location also store per location the four alternative addresses, A, to be read next, with the decoded binary characters, 00 to 11, assigned to the addresses concerned as output data, DO; one of the addresses is then selected by the active character, A, B, C or D, of the coded input data, DI. These decoding columns, 6 to 9, can be deduced from coding columns 2 to 5.

FIG. 5 shows the converted output information, DO, as an example of binary input information, DI, of 12 bits. The converted output information, starting from the start address, 0, the memory addresses 6-1-7-6-5-2- is run through in succession, character by character.

FIG. 5 shows how the generated, encoded output information, C-C-B-C-D-B causes the same memory run-through during the decoding process, thereby reproducing the original, encoded binary information.

Depending on the selected direction of assignment, the memory run-through is oriented on the basis of the coding or decoding information of the memory unit. If encoded and coded data have the same structure and representation format, e.g. in the case of binary data blocks with the same block length, the assignment directions for coding and decoding can be reversed arbitrarily.

While the task of data encoding and decoding is solved using the same data carriers for the transmitting and the receiving unit, the task of identification requires individual data carriers, which reveal their identity to an inquiring analysis unit as a response message. [Such identity revelation is similar to the manner in which a finger print is employed as the identification characteristic.] An initially unknown, individual data record is communicated to an analysis unit in an initial reading procedure (acquaintance procedure), and this data record is later used for the purpose of identification. As was true in the case of the data record of the finger print, the problem arises here of data-protected, secure storage of this identification characteristic, together with the problem of relocation, i.e. protected data access for identification purposes.

A suitable storage process here is associative storage, i.e. contents-addressed storage. When this storage process is employed, the stored data is automatically accessible via the identification process only, by means of the secret response message which reveals the identity.

A further development of the invention is based on the task of storing encoded response messages identifying messages, objects or persons with background information associatively. Such associated information, in accordance with the invention, is accessible only via an encoded message. Thus, for the invention, the time-consuming associative search and comparison processes, and the complexity of known associative storage systems of the prior art no longer apply.

The objectional search and compare task of the above-noted prior art is solved by the characteristic features of the claimed invention. This novel solution of this invention provides for memory units which divide an input message of arbitrary length into discrete characters, which then form address branch trees without search processes. Novel branch addresses are formed by a process of self-address, which grow with each new input message. In contrast to known search trees, in this invention the characters of the input message do not serve as search arguments for a search and comparison operation, but rather are a direct addressing element for a nodal group. The number of nodes in a nodal group, for the invention, is specified by growth information for each individual node; consequently, the nodes do not store the characters of the input message as a key definition either.

These memory units interpret the addresses of their memory locations as branch point addresses which store growth information for the individual branch points. A number of possible sub-branches, corresponding to this growth information, emanate from each node. Each new input message enters in these memory locations a number of consecutive branch point addresses. The number of sub-branches, available for branch point addresses are, in principle, arbitrary, but are in each case unassigned. A subset, usually a specific address, is selected from among these available branch point addresses. The selection in each case is done by the active character in the input message concerned.

In keeping with the above-stated principle, different sub-branch structures are able to grow from the branch points on the basis of the growth information as determined by the content of the input message. Even when the characters defining the input content are identical in terms of signal length or informational content; only the location characterizing the branch point bears its growth characteristics or is supplied with these characteristics from the memory unit, the input message or some other source. In this way, an address branch tree grows step by step with each new input message, and the ends of the sub-branches of this tree represent the end of the input message, i.e. the final character of this message.

The converted output message assigned to the input message, for example, or its storage address can be entered in this last memory location selected by the final character in the input message. It is also possible to enter the same memory unit or any other memory unit starting from this end point with a subsequent message functioning as the input message. All types of memory units can be used here, organized in a hierarchic structure according to access times and storage capacities; slow memories with serial access functions can be temporarily converted into memories with random access for this purpose.

No further addresses are entered in the memory for input messages which are already known. Each case starts from a defined start address, which is generally on the trunk of the tree, but can also be located at a defined branch point. The memory unit is run through and read step by step in an address sequence which is determined by the previously stored address branch tree, until the final character of the input message finally calls a final memory location on the address branch tree which—acting, as it were, like the "fruit of the tree"—contains the converted output message assigned to the input message or its storage address.

Conversion of the input message can also be carried out character by character during the address run-through, in which case a stored character of the output message is collected from each read location, in addition to the following branch point addresses.

Assessment of whether an input message is new is carried out at some point in the course of the address run-through by the address branch tree, when a character of the input message, which is active at the time, encounters an unwritten memory location by its branch point address selection. From this point on, all subsequent sub-branches of the branch tree are stored, as the memory enters into this unwritten location a number of arbitrary, but unassigned, unwritten addresses which corresponds to the number of sub-branches as branch point addresses. The character of the input message which is currently active (1) selects a specific, next-following address from these branch point addresses, (2) reads the address, and in turn (3) identifies it as an unassigned location, and so on.

In order to identify whether each polled memory location is to be interpreted as an unwritten location, a branch point or the end point or provisional end point of an input message, it can store additional identification codes which control the appropriate storage processes in each case accordingly. In addition to the down-line branch point addresses, the polled memory location can also store the up-line branch point, for example, i.e. the point from which the sub-branch concerned emanates. This enables erasure of input messages which are no longer relevant, for example, which must proceed from the end address. For the purposes of subsequent erasure operations, a supplementary tree can be fed simultaneously as the master tree grows, relocating each input message which is converted into plain text or a relevant unit of information to the appropriate end or storage address.

The growth of the memory unit or the address branch tree can be extended as required by means of linear memory expansion. A total of $A < 2xnxm$ storage addresses are required, for example, for input messages in block by block binary character presentation at n bit block length for the storage of m input messages as an address branch tree at $m < 2^n$.

Figure 1:
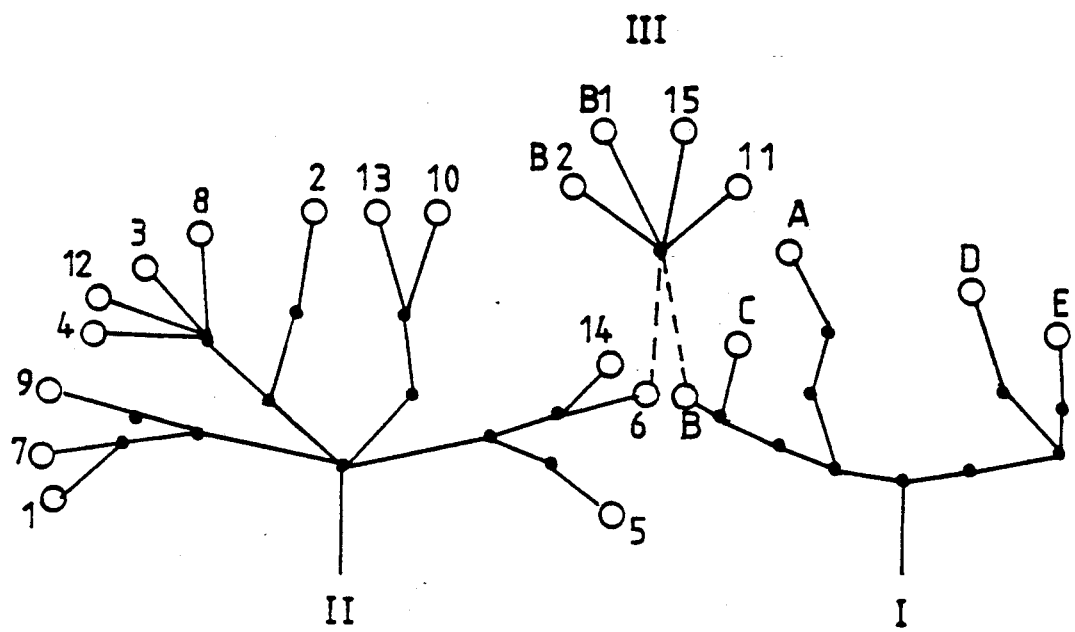
FIG. 1 depicts address branch trees I II III each having intermeshed address branches in accordance with the invention and wherein the branch dots are nodes, and the circles are branch endpoints.

FIG. 1 shows a general diagram of the principle. Two address branch trees, I and II, are shown, growing, for example, in separate memory units and jointly feeding a third address branch tree, III, via a sub-branch on each of the supplying trees. A point denotes a branch point, a circle represents each end point of the branch tree, i.e. its fruit. The informational content of the input message in terms of characters determines the number of sub-branches at the branch points; trees II and III grow with four possible sub-branches per branch point, while tree I, with binary input messages and bit by bit processing, forms only two sub-branches per branch point. In general, these branch trees will, as in the case of their natural counterparts, never be complete, due to the redundancy in the input messages; branch tree II, for example, which possess a total of 64 possible end points, bears only 13 "fruits", which require a total of 12 branch point addresses and 13 end addresses. Branch tree I, which enables the formation of a total of 16 end points, bears 5 fruits, for which it requires 10 branch point addresses and 5 end addresses.

As an illustrative example of binary-state input messages with a block length of $n=4$ bit and bit-by-bit processing as Table 1, FIG. 2 shows the memory content of such a memory unit organized associatively by means of an address branch tree, in the form in which it has grown with $m=5$ successively entered new input messages. In accordance with the 5 successively entered input messages, which are stored in sequence in a storage unit, A, growth of the address branch tree is carried out in the 5 stages shown; the new address entries effected by means of writing operations are shown in hatched boxes.

Each written, i.e. assigned location stores two alternative addresses of the memory unit as the next branch point addresses to be called, together with a control code, DO. Code $DO=01$ denotes a branch point, i.e. an address in memory 1 and $DO=11$ denotes an end point, i.e. a storage address in the storage unit, A. In order to provide a clearer picture, unwritten, i.e. unassigned locations are shown as neutral locations; in practice, they would require identification by means of appropriate codes, e.g. $DO=00$.

Figure 3:
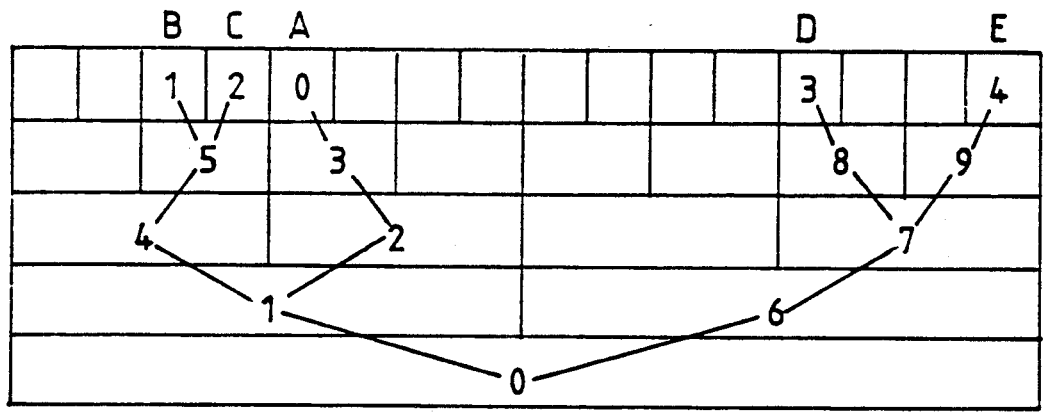
FIG. 3 shows a branch level diagram of an address branch tree (based on tree number 1, FIG. 1) of the memory in accordance with FIG. 2 as it has grown to memory stage, number 5.

FIG. 3 shows the address branch tree of the memory as it has developed up to stage 5 in diagram form; this branch tree corresponds to tree I in FIG. 1. The formation of a new branch tree, III, shown in FIG. 1 is carried out in this illustrative example by means of an additional code, III, which is stored in the storage unit, A, which indicates, for example, that the input message requires a further branch and which activates, for example, a memory unit, III, for a new address branch tree which is to be formed for the following characters of the input message. This principle of address-related memory expansion is particularly advantageous for input messages with extremely varied numbers of characters.

The described associative storage process is advantageous for all areas of application which require storage of, and data-protected access to, secret or encoded identity data. Using this principle, identifying messages can be analyzed during the memory run-through on stipulated address branch trees or address branch trees which are generated anew for each message. Using direct memory access, extensive messages, which describe the identity of an object, a person, etc., can be converted into appropriately assigned output messages; for flying objects which are to be identified, for example, a sum of many items of measurement data, such as speed, direction, altitude, etc. can be converted into appropriate identity data by flight-tracking in the memory unit. Or all known features describing a person can be converted into assigned identity data, etc.

Provided below is a detailed description of an embodiment of the identifier and coding device on the basis of FIGS. 6 to 13.

FIG. 6 shows the cross-section of a ring to be worn on the finger as a mechanical design example for an individual data carrier, consisting of the integrated circuit, D, which is installed in protected condition in a gap between two ring halves, 1 and 2, which are insulated from one another but firmly mechanically connected to one another. The two electrically conductive ring halves enable contact to be established between the integrated circuit and the two contact points, 3 and 4, on the analysis unit.

Figure 7:
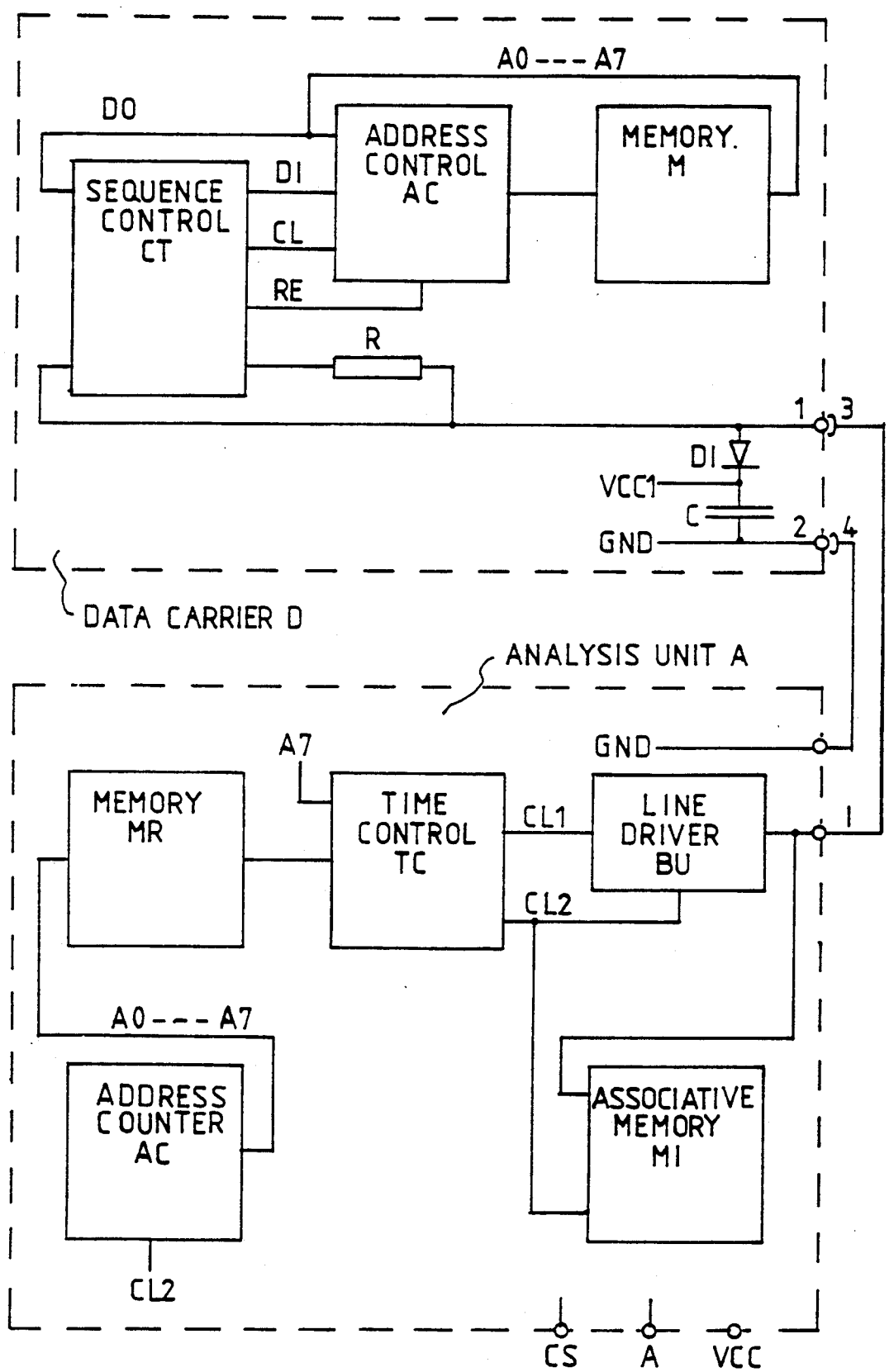
FIG. 7 depicts a circuit diagram of an individual data carrier generating unit as connected to an analysis unit.

FIG. 7 shows the circuit diagram of the individual data carrier, D, with the analysis unit, A, connected to it. Contact point ⅓ serves the purpose of bit-by-bit signal transmission of binary inquiry and response messages, while contact point 2/4 provides the ground, GND. The analysis unit is described as an example application, which processes inquiry and response messages autonomously, i.e. without an analysis system connected down-line. Such a system is consequently suitable for decentralized applications, such as vehicle and apartment doors, etc.

The example of the individual data carrier described in FIG. 7, on the other hand, is suitable for universal use. It requires a chip surface area of less than 4 mm$^2$ as an integrated circuit in CMOS technology and operates as follows:

When the data carrier, D, is connected via contact points 1/3 and 2/4 to the analysis unit, A, the pulses of the inquiry message, I, of the analysis unit, which is continuously repeated block by block, load the capacitor, C, as the energy storage unit for the supply voltage, VCCI, via the diode, DI for an initial period of approx. 20 ms, and then control the sequence control system, CT. This sequence control system measures the time intervals, T1, T2, T3 between the falling edges of the inquiry message (FIG. 8) and interprets these time intervals as information "0" or "1" of the inquiry message or as the criterium "block end".

In the case "block end" is detected by the sequence control, CT resets the address control system, AC, to a defined start address with the reset signal, RE, and thereby addresses an initial location of the read-only memory, M, which contains, for example, an unknown unit of identification information in 256 locations of 9 bits each. With the next falling edge, 1, of the inquiry message, I, the sequence control system transfers the first message bit, DI, (a "0" in the example) interpreted from the first time interval of this message and the addressed first reading data, A0 to A7, of the read-only memory to the address control system, AC, by means of the transfer pulse, CL, for the purpose of generating the new address. Such addressing—depending on the inquiry message and the identification information—identifies a second location of the read-only memory M; at the same time it also collects the first addressed output data, DO, and transmits this via a decoupling element, R, to the analysis unit.

The next falling edge, 2, of the inquiry code also causes collection of the second batch of read output data, DO, and transfer of the second inquiry bit, DI ("1" in the example) and the second batch of reading data, A0 to A7, to the address control system. During this collection and transfer process a third location of the read-only memory, M, is addressed, and so on. In this way, n=256 reading data words of 9 bits each, the 8 bits from A0 to A7 of which serve the purpose of internal self-addressing of the read-only memory, are read from the read-only memory by an inquiry message with a block length of n=256 bits. The data carrier transmits the ninth bit, DO, via a decoupling element, R, to the analysis unit, as a response message with a total of n=256 bits.

Analysis unit, A, receives these response bits with the clock pulse CL2, by switching its line driver, BU, to tristate status on a bit-by-bit basis, i.e. converting it from low-resistance to high-resistance status. After a specific access time in relation to the falling edge of the inquiry message, these response bits are valid at the output of the read-only memory, M, until the next falling edge, but are overlapped before the decoupling element, R, by the inquiry message, until the latter acquires tristate status.

The analysis unit can determine the decoding/coding assignment direction by means of the block-end criterium contained in the inquiry message. For example, if two defined time intervals are provided for the purpose of differentiation; e.g. T3=2 T2=4 T1 and T4=2 T3, the sequence control system, CT, converts these time intervals into an appropriate control signal, which controls the assignment direction of the data carrier.

Figures 8, 9, 10:
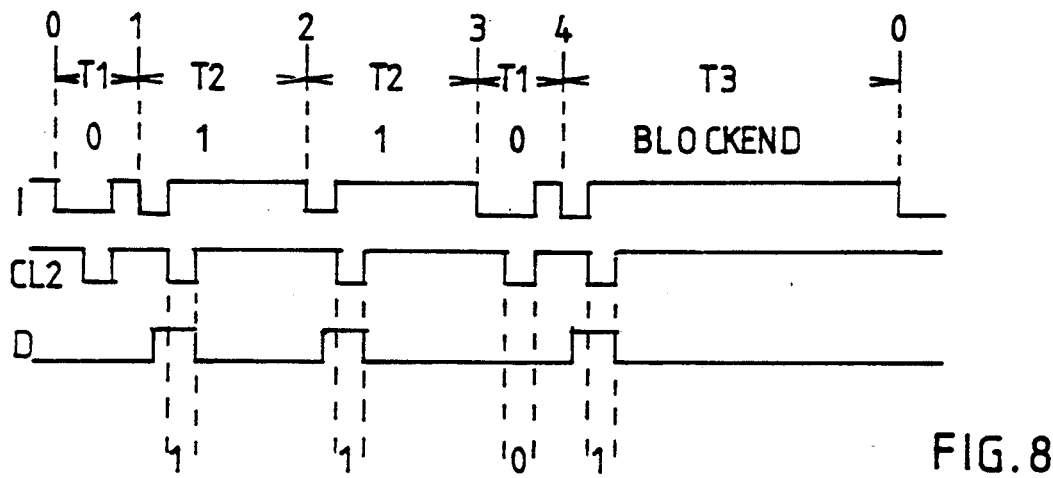
FIG. 8 is a pulse diagram of the signal traffic between the data carrier and analysis unit of FIG. 7 and promotes a clearer understanding of certain embodiments of the invention.
FIG. 9 is a table useful in understanding identification information on a data carrier in accordance with the invention.
FIG. 10 is a table useful in further understanding of identification information on a data carrier in accordance with the invention.

FIG. 8 shows signal communications between data carrier and analysis unit. The sequence control system, CT, of the data carrier can be produced in self-calibrating design for the time intervals T1, T2, and T3 which are to be measured, when the time ratios are stipulated (in the example, T3=2T2=4T1), by enabling it, for example, to count out these time intervals using a clock-pulse generator and a counter and to store the result of this counting operation with the appropriate definition as an analysis reference in a register or memory. Additional special signals can be produced accordingly.

The analysis unit, A, which can also be produced as an integrated circuit in CMOS technology, operates as follows:

An address counter, AC, operated by a clock pulse, CL2, continually addresses the 256×1 serially-organized read-only memory, MR, which stores the individual inquiry message of the analysis unit as arbitrary random information in 256 locations. A time controller, TC, converts the individual bits of this inquiry message into the time intervals T1 and T2 (FIG. 8) by means of the clock pulse CL1 and CL2 via a line driver, BU and, controlled by address A7, ends each of the continuously repeated message blocks with the time interval T3, i.e. with the criterium "block end".

A memory unit, MI, for associative message storage, receives each response message of the data carrier bit-by-bit when line driver, BU, is switched off by the trailing edge of clock pulse CL2. In this way, it carries out bit-by-bit storage of an address branch tree in an initial reading procedure, and at the end point of this tree it stores the respective assigned identity data or also simple control signals, such as closing authorization for vehicle, apartment door, etc. This control data, CS, and any appropriate storage addresses, A, then initiate and-/or control identification-related processes.

Such initial reading procedures by means of self-programming analysis units enable the user himself to carry out very simple, immediate adaptation of the analysis units to new individual data carriers which may be used to accomplish many varied tasks. Such tasks include, but are not limited to [are to be used]; programming authorization, handing-over of keys, such as is involved in the purchase or rental of vehicles, apartments, etc.

In larger systems with a large number of users, for example in bank systems, it is expedient for identification to be carried out in stages. When an account is opened, the bank establishes an initial response message of the customer by carrying out initial reading of the customer's individual data carrier using a standard inquiry message (e.g. bank code); this initial response message then addresses a memory unit incorporated in the bank's EDP system and reads an inquiry message relating to the individual customer from this memory. By means of this individual inquiry message the bank establishes a second response message of the customer through a second initial reading of the data carrier, or several response messages, which eventually address the customer's account or the storage address of the account by means of a character-by-character associative process. In future, the analysis unit will then establish the inquiry message relating to the individual customer in a first step, e.g. by means of the bank code, and in the second step it will carry out identification using this individual inquiry message.

The message block length of 256 bits selected in the example enables $2^{256}$, i.e. approx. $10^{75}$ different inquiry and response messages to be used. This inconceivably high number of possible messages means that unauthorized tracing of a response message or the identification information of the data carrier by means of trying out possible combinations is totally impossible, even with the most modern data-processing systems.

FIGS. 9 and 10 show the identification information of the data carrier for this example of binary, bit-by-bit conversion, whereby the message block length has been reduced to 4 bits and the capacity of the read-only memory has been reduced to 4 locations, in the interests of clarity; FIG. 9 shows these identification information units stored in the 4 locations in a form of presentation analogous with FIG. 4.

The address bit AO divides the memory unit into two halves; for the purpose of encoding, one half of the memory (addresses 0, 1) store arbitrary random information in column 1 as output data DO, and the corresponding addresses, 2 and 3, in the other half of the memory store the inverse information to this, DO. Each location also stores 2 arbitrary addresses, A, each for coding (columns 2 and 3) and for decoding (columns 4 and 5), with different, assigned output data, DO, for each address, and one of these addresses is selected by the currently active bit of the input data, DI, and read.

FIG. 10 shows the complete binary presentation of the identification information converted from FIG. 9 with 13 bits per storage address. These 13 bits, which are shown for the purpose of clarifying the principle, can be reduced to the 3 bits per storage address which are shown in hatching on the basis of the following logic operations:

DO′=DO/EXOR/DI (EXOR operation)
AO′=DI during coding
AO′=AO/EXOR/DI (EXOR operation) during decoding.

The two different operations for AO′ determine the assignment direction alone, i.e. switching between coding/decoding is effected solely by appropriate switching of the function AO/DI.

FIGS. 11 and 12 show a diagram of the address branching network for both assignment directions of this data carrier, starting from the start address, 0, of the read-only memory, resulting from the identification information of the read-only memory as presented in FIG. 10. the locations addressed by DI=1 are shown in hatching; the locations which store a "1" as output data DO are marked by a circle. The inquiry message "0110" shown in FIG. 8 as a pulse diagram results during coding in the passage through locations 1-2-3-1 of the read-only memory as marked in FIG. 11 and subsequently in the formation of the assigned response message "1101". During decoding, this message "11 01" results in the same passage through locations 1-2-3-1 of the read-only memory as marked in FIG. 12, as a result of which the original message, "011 0" is recovered. During this conversion process between the inquiry and response message, the actual identification information of the data carrier remains unknown; the only factor which can be established in each case is the response message associated to the identification information for a specific inquiry message from among $2^n$ possible messages.

FIG. 13 shows the table of the $2^n=16$ possible assignments between inquiry message and response message deduced from the address branching network, FIG. 11, for the described illustrative example with a message block length of n=4. A corresponding table can be deduced from the address branching network in FIG. 12 for inverse assignment direction, but this can also be obtained by exchanging the inquiry and response message from the table in FIG. 13.

In accordance with a characteristic feature of the claimed invention this assignment can be altered arbitrarily, by means of repeated renewed internal entry of the response message in the data carrier after intermediate storage, prior to transmission to the analysis unit—a maximum of $2^n$ times, with reversed bit sequence, if required.

FIG. 13 shows in column 11-identifier, an example in the form of the response message obtained after the first run-through by temporary storage and reversal of the bit sequence in a second run-through; inquiry messages which differ in their final bit only can no longer be correlated via their response messages here, which means that these data carriers can also be used as pseudo-random generators. A run-through of all possible identification codes is impossible, even with the fastest computers of the future, for the message block length with assignment code with $2^{256}$ possible identifiers which is actually provided in the example.

The capacity of the described identification-data carrier to stipulate the identify in a key, on which arbitrary messages of a code reflect assigned messages of another code, makes it suitable for all applications which require identification in some form, e.g. as confirmation of authorization or identity-related coding, e.g. for data protection and data transmission. Described below are some of these possible applications, for which the user requires only one and the same individual data carrier:

The telephone offers various possible applications; the individual data carriers can be used as confirmations of authority, like telephone keys, for example; in conjunction with appropriate unit-meters they enable selective payment of telephone charges according to the various users of a private telephone; as identity verification units they can be used in passing on telephone calls to the place at which the intended recipient of the call is located and in enabling personal messages recorded by telephone answering machines to be called up. Finally, this data carrier could be used to enable the non-cash use of any private or public telephone, if the response message and charge were to be assigned to central telephone accounts and included in the monthly telephone bill.

A diverse range of applications is offered by all types of closing systems in conjunction with electromechanical locks. The same individual data carrier opens the doors of vehicles, house, apartments, safes, letter boxes, cupboards, desks, barriers in multi-story car parks, operational access locks on machines, directly and remote-control operated garage doors, etc. In conjunction with suitable analysis systems authorizations subject to time restrictions can be produced for the individual data carriers, e.g. daily or weekly restrictions for automatic ski-lifts, authorization to enter factory premises at certain times of the day only, etc. The practically unlimited supply of possible inquiry messages enables the message to be altered after each case of use.

The control and monitoring of persons and facilities offers further possible applications: The individual data carriers can be used, for example to provide the hierarchically-structured access and operating authorizations for data-processing systems which are currently provided by means of code words; the same applies to operating authorization for military equipment. Goods in transit which are subject to safety or security requirements can be monitored using these data carriers and safeguarded against handling by unauthorized persons.

As the identification base of the data carrier is absolutely secret, forge-proof and impossible to copy when produced in the appropriate configuration, the data carrier possesses unmistakable, verifiable authenticity features, which open up relevant fields of application such as forge-proof identification cards, currency, etc. By incorporating additional personal data and digitalized, unchanging personal features, such as the dermal ridges on fingers, into the response message, a distinct, verifiable relationship can be established between the person and the data carrier, making the individual data carrier suitable for use as a forge-proof identity card. The sub-task producing a verifiable, distinct relationship between the person and the data carrier is solved by the characteristic features as claimed.

Finally, the individual data carrier can be used as a means of identification for payment transactions, in place of the check card. With an additional erasable and re-writable memory, which can be loaded with a credit sum in storage locations assigned for each specific case by certain recipients of payments, such as the post office, transport service, etc., it can be used as a direct means of payment for these recipients of payments. This sub-task of developing the data carrier into a means of payment is solved by the characteristic features as claimed.

The capacity of the data carrier to enable associative data conversion without revealing the key for either assignment direction, opens up a diverse range of applications in the field of data protection, copy protection and data coding.

For the purposes of the maintenance of secrecy, data protection or copy protection, the respective data media (floppy disc, cassette, tape, compact disc, etc.) can be provided with such individual data carriers acting as encoders—e.g. as a semi-conductor chip glued to the floppy disk cover—which individually code the data during recording and decode the data again during playback. This sub-task of employing the data carrier for purposes of secrecy, data protection or copy protection is solved by the characteristic features of the claimed invention. The encoder serves in this case as a forge-proof, individual authenticity feature of the author, without which reproduction or copying of the data is not possible. In this way, computer software, digital audio and video recordings, recordings subject to data protection requirements, etc. can be provided with reliable protection against copying. They are additionally protected against misuse and theft, when the data medium and the "key-holder" are kept in separate places. The miniaturized, low-cost design of the key-holder, which requires only two contact points, is particularly advantageous for these applications.

A further area of application is the transmission of coded, forge-proof data in accordance with another characteristic feature of the claimed invention. Persons and/or objects who/which possess the same identification information, which is totally unknown and inaccessible to third parties, can exchange coded data or messages which remain totally inaccessible to the-third parties by means of this common identification base.

Figure 14:
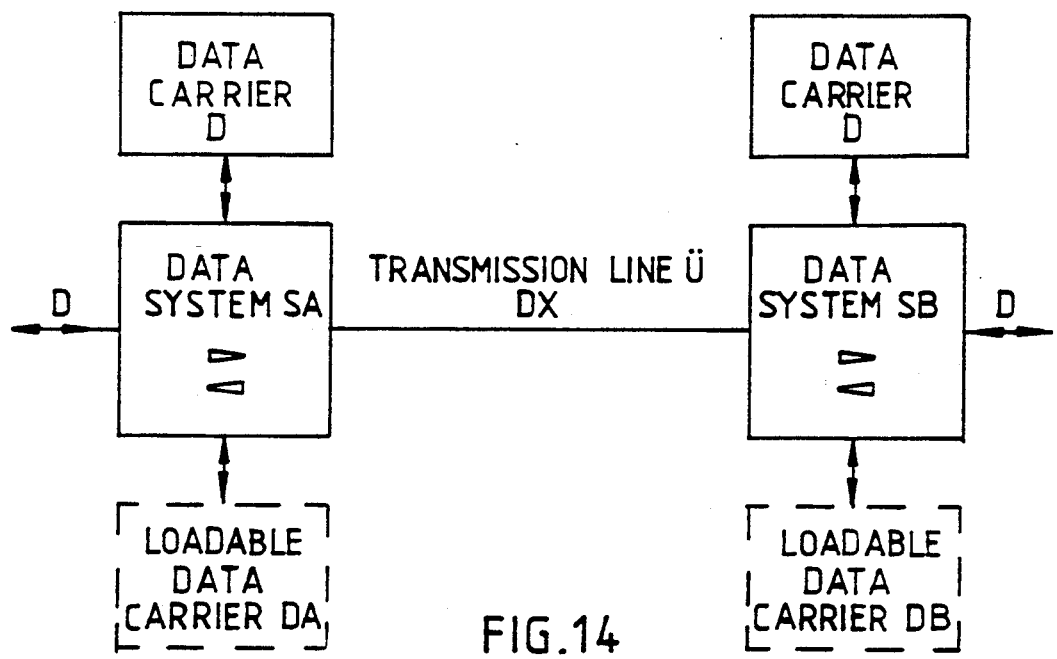
FIG. 14 depicts a telephone, or other medium transmission line, employing encoded/decode carriers in accordance with the invention.

FIG. 14 shows such a case of application of identification-data carriers for coded data transmission: Identification-data carriers, D, in accordance with FIG. 7 with the same identification information are assigned to each of two data systems, SA, SB, which exchange coded data, DX, via a transmission line, Ü; these identification-data carriers result-in encoding, D−Dx, or decoding, Dx−D, of the data in the manner described above for FIG. 7.

Data carriers which carry out conversion not as fixed units, linked to specific systems, but as universal units for many different applications, must begin each conversion procedure with a defined start address, starting from which the same encoded data always generates the same coded data, which makes it possible for data to be recorded for the purpose of subsequent simulation. This possibility can be prevented by continuous, sporadic or block-by-block alteration of the identification base. This sub-task of altering the identification base of the data carrier, i.e. the key, continuously, sporadically or on a block-by-block basis, is solved by the characteristic features of the claimed invention.

In a further development of the invention, this alteration results in an identifier which is generated by means of a random data-generator, e.g. by the encoding data carrier; this identifier is transmitted in coded form between the data carriers and changes the identification basis, i.e. the branch tree of the data carriers, by means of linkage, e.g. addition, with the address bits which are generated step-by-step for the purpose of self-addressing of these data carriers, in the example, FIG. 7, address bit A0 to A7.

Another method of changing the identification base for code conversion is provided by the combination of a fixed identification base with a loadable identification base, in the form of a read/write memory, for example, the complete or partial identification information of which is loaded arbitrarily from random-data generators and transmitted between the transmitter and the receiver by means of the fixed identification base or to ·the previously formed key in each case. The identification base can change as often as is required, which means that the period length of this coding is unlimited; recurrent encoded data blocks will not generate recurrent coded data blocks if genuine random data are generated for this purpose, using noise generators, for example. This process provides absolute protection against recording and subsequent simulation of data communications, as when the length of the data block is sufficient each transmission is unique, due to the key being used once only.

As an example of data transmission by means of this process, FIG. 14 shows additional loadable identification-data carriers, DA, DB. Prior to commencement of data transmission, both data carriers, DA, DB, store arbitrary, different random data. Upon commencement of the transmission procedure, system SA, for example, reads the first location of data carrier DA, encodes this read data via the fixed identification base, D, and transmits it to system SB, which decodes the data via the fixed identification base, D and loads it into the first location of data carrier DB. System SB then repeats this procedure with location 2 of its data carrier, DB, the data of which is then loaded into location 2 of data carrier DA, and so on, i.e. a mutual exchange of data, coded via the common fixed identification base, D, takes place between the two systems, resulting in a common, identical identification base in data carriers DA and DB.

Figure 15:
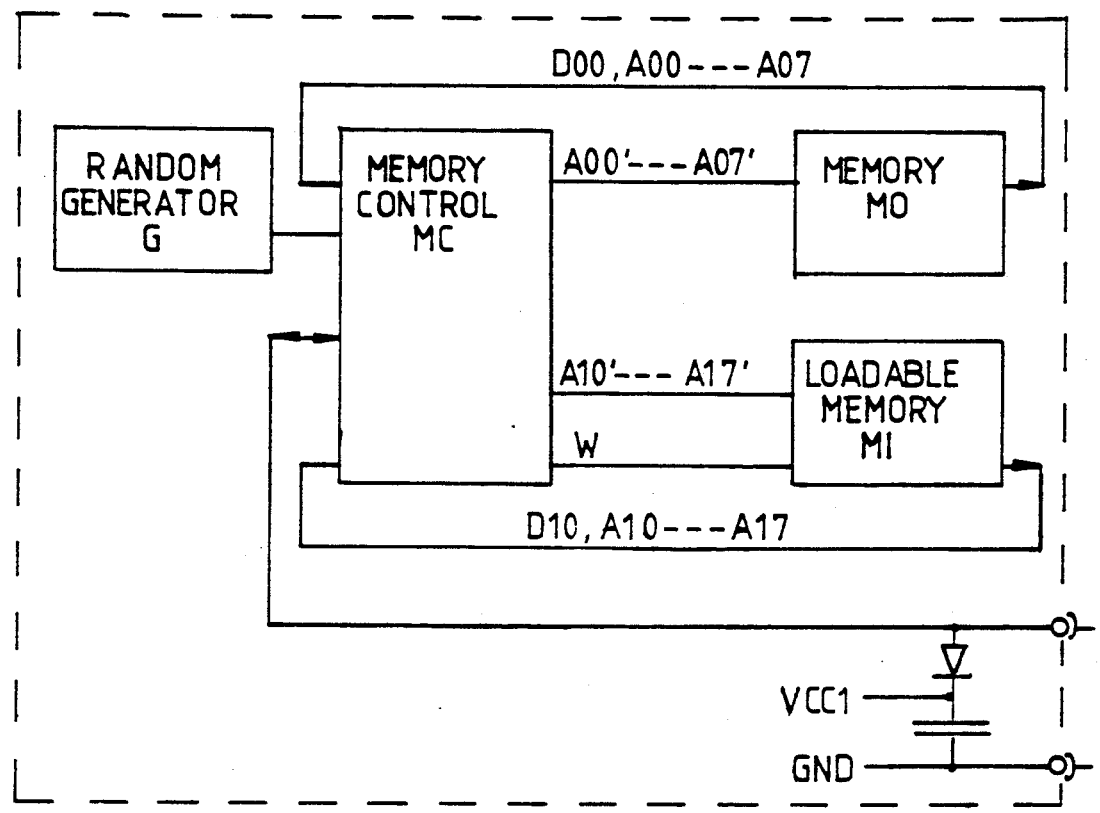
FIG. 15 depicts an identification unit for a joint data carrier of the type shown in FIG. 14.

This above-described common identification base then encodes and/or decodes the data block which is subsequently to be transmitted, after transmission of which a new identification base is generated in data carriers DA and DB in the described manner by means of random data, and the next data block is then transmitted using this identification base, so on. The loss in data-transmission speed resulting from the additional key transmission can be avoided, if each block of user-data which is transmitted itself generates the key for the next block of user-data by means of appropriate code conversion. The fixed and loadable data carriers D/DA and D/DB which are shown separately in FIG. 14 can also be combined on one joint data carrier to form one identification unit (FIG. 15).

This tap-proof, absolutely forge-proof, simulation-proof form of coded data transmission opens up a diverse range of possible applications for the identification-data carrier in all types of data communications, e.g. videotext, telefax, telex, telephone communications, etc.; among other things, it enables variable means of payment for payment transactions, which can be mutually exchanged in a process of direct data communication in accordance with a characteristic feature as claimed, i.e. on location and without having to go through a central processing system.

In this case, the forge-proof, unknown, common identification information which is assigned to all these means of payment, and which alone encodes and clears data communications and, consequently the payment transfer of these means of payment, serves as a verifiable authenticity feature, similar to the specific features of bank notes, for example. This verification can be carried out directly and mutually by the means of payment involved. This is advantageous for the retail sector, which can carry out payment transactions from the customer's wallet into the till, as has been customary until now: The customer's wallet and the shop till are each replaced by such a variable means of payment; the cash register is used solely as an entry keyboard and display unit, without any knowledge of the data-transmission key. This data-transmission key takes the form of a "single-use key", which is generated anew for each transfer from both means of payment, transmitter and receiver, in the manner described above via the common identification base. Random-data generators are employed, so that any recording and subsequent simulation, i.e. repetition of the data transmission between the means of payment, will be without effect. Forging of the payment transfer process by means of experimentation can be prevented by using an appropriately long block length for transfer operations.

In principle, data communications between the means of payment takes place in the manner shown in FIG. 14, whereby data carriers D/DA and D/DB take the form of the two means of payment and the transmission systems, SA, SB, take the form of the shop till or an appropriate entry/display unit, which also provides the operating energy for data communications. To safeguard the correct functioning of payment transfer operations, data communications with mutual acknowledgement are recommended; if required, the transfer can initially be carried out subject to revocation and finally completed only upon acknowledgement.

The configuration shown in FIG. 14 enables long-distance transmission of payment amounts to be carried out by means of two entry/display units, SA and SB, which means that such a means of payment can be replenished at any time and at any place by means of long-distance data communications with other such means of payment.

These means of payment can be protected against theft or loss in conjunction with the above-described personal identification-data carriers. They can be made to open up for response messages which are supplied only by one or more authorized identification-data carriers, for example. The possibility of incorporating amounts in various currencies into the means of payment means that it can also be used in international payment transactions, whereby the entry/display units can carry out conversion and transmission of the currency amounts.

The procedures for coded data transmission described for FIG. 14 require a common identification base for the systems involved. This common base is not provided, for example, by person-related, fully individual, unique identification-data carriers. Here an alternatively activatable, loadable identification base combined with the fixed identification base on the data carrier offers the possibility of forming common keys on the basis of a prior initial reading process. Such keys can be produced for coded data communications between bank and customer, for example. To achieve this, the bank reads appropriate response messages relating to the individual customer from the data carrier by means of a first initial reading process, using arbitrary inquiry messages, and reversing the assignment direction if required. At the beginning of a subsequent data communication operation, these response messages are: (1) loaded in encoded form into the bank's own identification base, (2) transmitted in coded form to the customer's data carrier, (3) decoded via this data carrier's fixed identification base, and then (4) they are then loaded into the data carrier's loadable identification base.

Using this now common identification base arbitrary keys, generated by means of random data, and appropriately coded data can be exchanged between bank and customer, as described above, whereby this exchange of data is tap-proof, cannot be simulated and in all cases requires the authentic identification-data carrier. New identification bases can also be transmitted. The process is not restricted to two communication partners or systems, but also enables coded data exchange within larger groups, when the users have agreed, in prior personal contact, for example, on at least one common response message which can be transmitted to each user by means of the different, individual inquiry message assigned to each user.

This common definition can also be carried out in succession, e.g. by step-by-step transmission of the common response message between the respective users who are known to each other, A/B, B/C, C/D, etc., when each of these users who are known to each other possess a common identification base. In this manner, members of a group can incorporate new users who are known to them into the group. Finally, keys with hierarchic structures can also be produced within such groups by means of appropriate agreements to adopt several response messages. Transmission and receiver keys which are independent of one another are also possible, e.g. for selective decoding authorization within a group.

FIG. 15 shows as an example the circuit diagram of an identification-data carrier which combines the above-described basic function of the fixed identification base with the described further development to form a self-contained identification unit:

A read-only memory, MO, contains the individual, secret, unalterable identification base. A loadable read-/write memory, MI, which is required for the duration of data communications only, can be loaded with identification information which is transmitted in coded form and decoded in the MO, to form common identification bases, whereby all operations of both memories are controlled by the memory control system, MC. A generator, G, generates random data, which also loads memory MI and which is transmitted in coded form via MO to the opposite side, to form a common identification base.

With this identification unit all the above described functions relating to identification, data protection and coded data transmission between persons and objects can be carried out.

I claim:

1. A method of encrypting/decrypting messages, whereby an input message provided as characters is converted character-by-character, dependent on preceding characters, into an output message, the steps of the method comprising: defining a branching network as a carrier of encrypting/decrypting characteristics, said branching network comprising nodes linked together by selectable branches, wherein each node has a number of selectable branches leading to optional nodes, and wherein at least one encrypting/decrypting character is assigned to each of said selectable branches; defining a selection run, which is a step-by-step selection of said selectable branches on the basis of the character-by-character input message to select character-by-character an encrypting/decrypting characteristic; defining said output message, which is formed on the basis of said selected encrypting/decrypting characteristic; said selection run, starting from a first selected node, selecting on the basis of currently active characters of the input message said selectable branches, to convert any specific input message of optional length character-by-character into a specific selection path through said branching network, whereby the same nodes on said selection path can be selected repeatedly; and forming said output message in at least one selection run on the basis of said encrypting/decrypting characters assigned to said branches selected on said selection path.

2. The method as defined in claim 1, further comprising forming said branching network to carry said encrypting/decrypting characters for selectable opposite encrypting/decrypting directions.

3. The method as defined in claim 1, further comprising forming said characters of the output message by means of several of said selection runs, so that an input message of a next selection run is based on the output message of a preceding selection run, whereby the character sequence of said input message can be altered.

4. The method as defined in claim 1, further comprising forming said branching network on the basis of internal process messages and/or external messages.

5. The method as defined in claim 1, further comprising forming identical branching networks for coded transmission of messages, said branching networks carrying said encrypting/decrypting characters for opposite encrypting/decrypting directions on the transmitting and receiving sides respectively of the formed networks.

6. The method as defined in claim 1, further comprising associating said individual branching networks with particular objects to identify, transmitting at least one said input message as inquiry message for the purpose of encrypting/decrypting by means of said associated individual branching networks into at least one said output message as response message which is individual with regard to said inquiry message and said encrypting/decrypting, and identifying said obtained response message as an identification base or key for subsequent processes or communications.

7. The method as defined in claim 6, wherein said step of identifying the obtained response messages comprises the following substeps: defining a branch tree for storing the characters of said response messages in the form of selectable branches, said branch tree comprising a root node at a first level, and additional nodes arranged at subsequent levels, said root node and additional nodes being linked together by branches, whereby, beginning with said root node, from each node of said levels a number of selectable branches lead to nodes at subsequent levels until a branch leads to a last selected node, wherein said last selected nodes are carriers of key information for identifying; defining a formation run, which is a step-by-step forming of said selectable branches on the basis of said character-by-character response messages, to convert any specific response message character-by-character into a specific selection path through said branch tree which ends at said last selected node and whereby each node on said selection path is selected once only; defining a selection run, which is a step-by-step selection of said formed selectable branches on the basis of a character-by-character response message, to identify said response message; said selection run, starting from said root node, selecting on the basis of the currently active characters of said response message, said selectable branches until either it reaches said last selected node for identifying or until, in the case of an unknown response message, no branch is assigned to a present character, whereby said missing following branches including the last selected node will be formed by said formation run.

8. The method as defined in claim 1, further comprising forming said branching network on the basis of random events.

9. A message encrypting/decrypting system comprising:

forming means for forming a branching network as a carrier of encrypting/decrypting characteristics, which branching network comprising nodes linked together by selectable branches, wherein each node has a number of selectable branches leading to optional nodes and further wherein at least one encrypting/decrypting character is assigned to each said selectable branch;

selecting means for selecting in a step-by-step selection run said selectable branches on the basis of the character-by-character input message to select character-by-character an encrypting/decrypting characteristic;

controlling means for forming the output message on the basis of said selected encrypting/decrypting characteristic;

said selection run, starting from a first selected node, selects on the basis of the currently active characters of the input message, said selectable branches, to convert any specific input message of optional length character-by-character into a specific selection path through said branching network, whereby the same nodes on said selection path can be selected repeatedly; and wherein said output message is formed in at least one selection run on the basis of said encrypting/decrypting characters assigned to said branches selected on said selection path.

10. The system as defined in claim 9, wherein said forming means further comprise means for forming said branching network on the basis of random events.

11. The system as defined in claim 9, wherein said forming means form said branching network, to carry said encrypting/decrypting characters for selectable opposite encrypting/decrypting directions.

12. The system as defined in claim 9, wherein said controlling means form said characters of the output message by means of several said selection runs, characterized in that the input message of a next selection run is based on the output message of a preceding selection run, whereby the character sequence of said input message can be altered.

13. The system as defined in claim 9, further comprising processing means forming said branching network or altering said branching network on the basis of internal process messages.

14. The system as defined in claim 9, further comprising: processing means forming said branching network or altering said branching network on the basis of external messages.

15. The system as defined in claim 9, further comprising means for forming identical said branching networks for coded transmission of messages, said branching networks carrying said encrypting/decrypting characters for opposite encrypting/decrypting directions on the transmitting and receiving sides respectively of the formed networks.

16. The system as defined in claim 9, further comprising means for associating individual said branching networks to particular objects to be identified, means for transmitting at least one said input message as inquiry message for the purpose of encrypting/decrypting by means of said associated individual branching networks into at least one said output message as response message; and identifying means identifying said obtained response message as an identification base or key for subsequent processes or communications.

17. The system as defined in claim 15, further comprising means for recording and reproduction of protected messages on said transmitting and receiving sides, and wherein said branching networks for opposite encrypting/decrypting directions are connected to said means for recording and reproduction.

18. The system as defined in claim 9, further comprising memory units as said forming means, the memory locations of which form said nodes of said branching network.

19. The system as defined in claim 18, wherein said memory locations are storing a number of said selectable branches as a number of selectable memory location addresses, one of said memory location addresses is selected on the basis of said currently active character of the input message, as the address for a subsequent memory location which is to be called.

20. The system as defined in claim 19, wherein each of said memory locations is storing two of said memory location addresses as two said branches which carry different said encrypting/decrypting characters, and wherein said selecting means divide said input message into characters with two possible information statuses, each said information status selects one of two said branches as said address for a subsequent memory location.

21. The system as defined in claim 9, further comprising means for supplementing said encrypting/decrypting characters with individual characteristics, said individual characteristics can be stipulated externally and cause individually identifiable output messages.

22. The system as defined in claim 9, further comprising means enabling the system to receive and process at least one activating signal in an initial time phase, said activating signal providing the operating energy for the circuit by means of the energy content of said activating signal, and means enabling the system to transmit at least one reaction signal in a second time phase, wherein all said means are constructed by large-scale integration technology, in the form of a miniaturized, integrated circuit.

23. The system as defined in claim 9, further comprising means for storing and exchanging monetary sums, said input messages and said output messages are equivalents to said monetary sums.

24. The system as defined in claim 16, wherein said identifying means for identifying the obtained response messages comprises:

first means for forming a branch tree to store the characters of said response messages in the form of selectable branches, said branch tree comprising a root node, at a first level and additional nodes arranged at subsequent levels, said nodes being linked together by branches, whereby, beginning with said root node, from each node of said levels a number of selectable branches lead to nodes at subsequent levels until a last branch leads to a last selected node, wherein said last selected nodes are carriers of key information for identifying, second means for forming in a formation run step-by-step said selectable branches on the basis of said character-by-character response messages, to convert any specific response message character-by-character into a specific selection path through said branch tree which ends at said last selected node and whereby each node on said selection path is selected once only;

third means for selecting in a selection run step-by-step said formed selectable branches on the basis of a character-by-character response message, to identify said response message;

said selection run, starting from said root node, selects on the basis of the currently active characters of said response message said selectable branches until either it reaches said last node for identifying or until, in the case of an unknown response message, no branch is assigned to a present character, whereby said missing following branches including the last node will be formed by said formation run.

25. The system of claim 9, wherein said means are all incorporated in a personal object.

* * * * *